United States Patent [19]
Sacks et al.

[11] 3,771,351
[45] Nov. 13, 1973

[54] METHOD AND APPARATUS FOR DETECTING SPOILAGE

[75] Inventors: Lawrence E. Sacks, Berkeley; Emory Menefee, Richmond, both of Calif.

[73] Assignee: The United States of America as represented by the Secretary of Agriculture, Washington, D.C.

[22] Filed: July 10, 1972

[21] Appl. No.: 270,426

[52] U.S. Cl. .................................. 73/52, 73/340
[51] Int. Cl. ........................................ G01n 25/48
[58] Field of Search .................. 73/52, 340, 341, 73/342, 15 B

[56] References Cited
UNITED STATES PATENTS
2,512,134  6/1950  Baule ............................ 73/52 X
2,975,629  3/1961  Herbert ......................... 73/15 B
3,699,813  10/1972  Lamb ............................ 73/342

FOREIGN PATENTS OR APPLICATIONS
452,922  5/1968  Switzerland ..................... 73/340

Primary Examiner—Richard C. Queisser
Assistant Examiner—Joseph W. Roskos
Attorney—R. Hoffman et al.

[57] ABSTRACT

System for non-destructive detection of spoilage in sealed containers of food or other perishable commodities. The invention utilizes the principle that growth of spoilage organisms is accompanied by an evolution of heat.

6 Claims, 4 Drawing Figures

METHOD AND APPARATUS FOR DETECTING SPOILAGE

A non-exclusive, irrevocable, royalty-free license in the invention herein described, throughout the world for all purposes of the U.S. Government, with the power to grant sublicenses for such purposes, is hereby granted to the Government of the United States of America.

DESCRIPTION OF THE INVENTION

This invention relates to and has among its objects the provision of novel method and apparatus for detecting spoilage in sealed containers of food or other perishable commodities.

Further objects of the invention will be evident from the following description and the annexed drawing.

Figure 1:
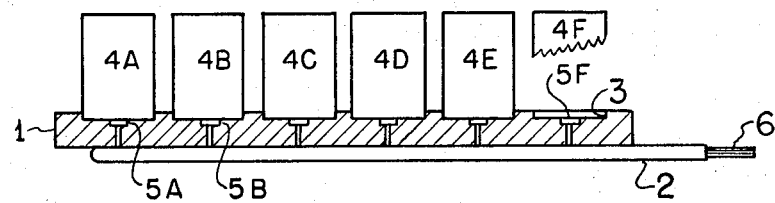
FIGS. 1 and 2 are schematic diagrams of apparatus in accordance with the invention.

In the following description, emphasis will be directed to food products. It is to be understood, however, that the invention is not restricted to foods, but is applicable to all kinds of perishable commodities such as vitamins and vitamin precursors; feeds; medicinal preparations; cosmetics; glues; pastes, latices; starches and proteins (industrial as well as food or feed grades), etc.

Canning is a universally used method of preserving foods. It involves sealing the food in containers—usually metal cans or glass jars—and then heating the sealed containers to destroy the microflora in the food and associated with the containers themselves.

It can be readily visualized that if the sealed containers are subjected to a very rigorous heating operation one can be assured that no viable micro-organisms will remain in the products, and no danger of spoilage will be encountered when the products are stored (assuming, of course, that the containers remain hermetically sealed).

However, there is another aspect to be considered and that is the quality of the preserved food—for example, its taste, texture, nutritional value, and color. These attributes, in turn, are dependent on the degree to which the food is heated and if the heating conditions are excessive, the quality of the food will be so low that the product will not be marketable.

In actual practice, therefore, the manufacturer must strike a balance between the opposing factors outlined above. His heating operation must be adjusted to such a level as to maintain the quality of the food, yet to achieve such degree of microbial destruction that the product will not spoil. The maintaining of this balance in day-to-day operations in a cannery is difficult, and at times some of the canned products will spoil. To prevent spoiled products from reaching the market, it has become conventional for canners to use the following technique: After the cans have been heat processed (or retorted, as this step is often termed) the cans are cooled and then stored at ambient temperature for a period of time. This storage provides, as it were, an opportunity for spoilage to develop in those cans which have not received adequate heat processing. When the storage period is up, the individual cans are examined for swelling (gas formation). This may be done visually, or, more accurately, by mechanical devices which test residual vacuum in the cans by the amount of tension required to flex the can ends. The cans which pass this inspection are forwarded to the usual marketing channels; those which show gas formation are destroyed.

Most spoilage micro-organisms are gas producers and therefore the above-outlined scheme of storage and inspection prior to marketing is of great benefit in preventing spoiled products from reaching the market. However, a few organisms (*Bacillus coagulans* and *Bacillus stearothermophilus*, for example) are not gas producers and therefore if the product should contain viable forms of such organisms, their presence cannot be detected by tests for gas formation. The type of spoilage in question is generally termed "flat souring" because the can ends remain flat, i.e., not bulged as they would be by ubiquitous gas-producing organisms. It is evident from the foregoing that even with the application of storage and inspection, there may be instances of undetected spoilage.

A primary object of the invention is the provision of means whereby spoilage within sealed containers can be detected regardless of whether the spoilage is caused by gas-producing organisms, flat souring organisms, or combinations thereof.

Another object of the invention is the provision of a system for spoilage detection which obviates handling of the containers and visual inspection thereof in that the indicia of product quality is displayed at any convenient location such as one remote from the containers.

A further object of the invention is the provision of means whereby spoilage in sealed containers can be detected at the time the spoilage occurs.

The invention utilizes the principle that growth of an organism is accompanied by an evolution of heat. Although this basic principle is known, it has never to our knowledge been applied for detecting spoilage within a sealed container, and, moreover, the bare knowledge of this principle cannot be used in any practical way for such detection. This is further explained as follows: One item to be considered is that the temperature developed by growing micro-organisms is measurable but minute, amounting to a few hundredths or at most a tenth of a degree, C. Because such a small temperature rise is involved, it cannot be differentiated from temperature variations caused by other factors. For example, if a can of food is held in an ordinary storage area and subjected to temperature measurements over a period of time, it will be found that the temperature will vary widely over several degrees caused by such factors as weather conditions, the usual diurnal temperature cycle, changes in air currents caused by movement of persons, doors, machinery, etc. Since these extraneous factors cause temperature variations far in excess of any which might be due to microbial growth, the procedure does not provide any indication of the quality of the food within the can.

In accordance with the invention the difficulty outlined above is obviated by a system which balances out extraneous temperature variations, that is, variations due to causes other than microbial growth. As a result, the quality of the food within the container can be assessed for spoilage even though the can is subjected to temperature variation by extraneous causes. Another advantage of the invention is that it is non-destructive—the detection is made without damaging or altering the product in any way. One manner by which such desirable results are obtained is next described in detail, having reference to the annexed drawing.

FIG. 1 represents a portion of a storage area wherein cans of a particular food are held after they have undergone the usual heat processing and cooling steps. In this area, the cans are held for a period of time to permit development of spoilage in those cans which may have inadvertently received inadequate heat processing or have pinholes or other defects of sealing.

Numeral 1 designates a representative support on the storage area, this support being preferably fabricated from a material which is an insulator (both electrical and thermal).

Support 1 is provided with circular recesses 3 for positioning cans 4 filled with a particular food. To differentiate individual cans they are designated 4A, 4B, 4C, etc.

Within support 1 is mounted a series of temperature sensors 5, the individual units being designated 5A, 5B, etc. These sensors may take the form, for example, of thermistors or thermocouples.

When cans 4 are in position on support 1, each sensor 5 contacts one of the cans (for example, sensor 5A with can 4A, sensor 5B with can 4B, etc.) and provides an electrical signal representative of the temperature of the can with which it is in registration.

Each of the sensors 5 is connected with appropriate lead wires (collectively designated by numeral 6) for conducting the electrical signals provided thereby. These leads are threaded through conduit 2 whereby to establish communication with a signal-processing means hereinafter described.

Figure 2:
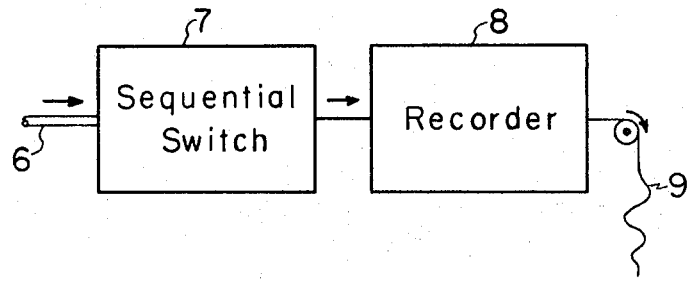

FIG. 2 depicts a signal processing and displaying means which includes sequential switch 7 and recorder 8.

The heads 6 from sensors 5 provide an input of primary signals to sequential switch 7. In the following explanation, the respective signals from sensors 5A, 5B, 5C, etc., are hereinafter designated as A, B, C, etc.

Figure 3:
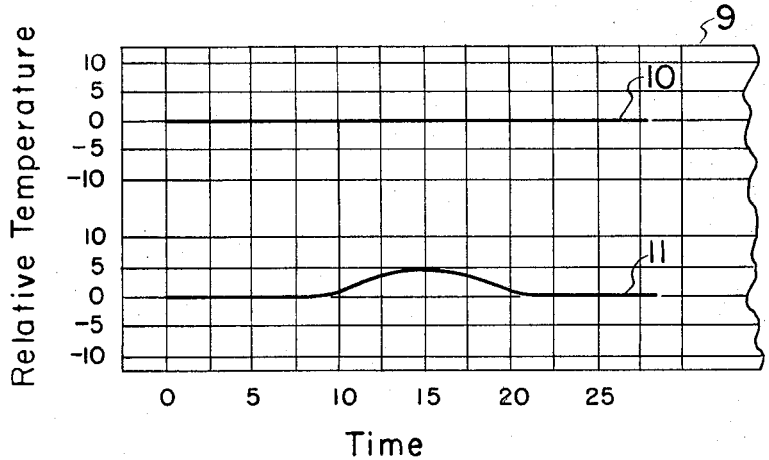
FIG. 3 depicts a position of a chart displaying results yielded by the apparatus of the invention.

Within switch 7 the incoming primary signals A, B, C etc., are processed as follows: At fixed intervals of time (for example, every hour) a pair of signals from adjacent cans are composited to form a secondary signal representing the difference between the primary signals so that this secondary signal represents the difference in temperature between adjacent cans. For example, at the first point of time signals A and B are composited to form a secondary signal A minus B, at the second point of time signals C and D are composited to form a secondary signal C minus D, and so on over and over again during the storage period. Switch 7 also operates to sequentially direct the secondary signals to recorder 8 where these are displayed, as by a dot on a recording chart 9. The aforesaid action is repeated as each pair of individual primary signals are composited. For example, at the first point of time the secondary signal A minus B is displayed, at the next point of time secondary signal C minus D is displayed, and so on over and over again during the period of storage. It is obvious that the displays of individual signals A minus B, C minus D, etc. need to be presented on chart 9 in such a manner—as by utilizing different portions of the chart—that the traces eventually yielded by each can be distinguished from the others. The traces or curves representing the secondary signals have the significance that they disclose the quality of each pair of cams, i.e., A and B, C and D, E and F, etc. In particular, where the secondary signals stay at zero the cans in the pair have no relative temperature difference, hence there is no spoilage. Where, however, the chart shows a positive or negative value, it means that one of the cans in the pair is warmer than the other—i.e., microbial growth is taking place within one of the cans in the pair. This item is further explained below in connection with FIG. 3 which depicts a portion of recording chart 9. In this figure, the units shown for temperature and time are arbitrary.

Trace 10 represents the secondary signal A minus B. Since the trace indicates a continuous relative temperature of zero, it signifies that no microbial growth is taking place in either can 4A or 4B.

Trace 11 represents the secondary signal C minus D. In this case the relative temperature remained constant at zero for a time and then rose to a peak at about the 15th unit of time. This means that that can, 4C, was warmer than can 4D, i.e., microbial growth occurred in can 4C. To sum up the results: Cans 4A, 4B, and 4D are free from spoilage and can 4C is spoiled and is to be discarded.

Figure 4:
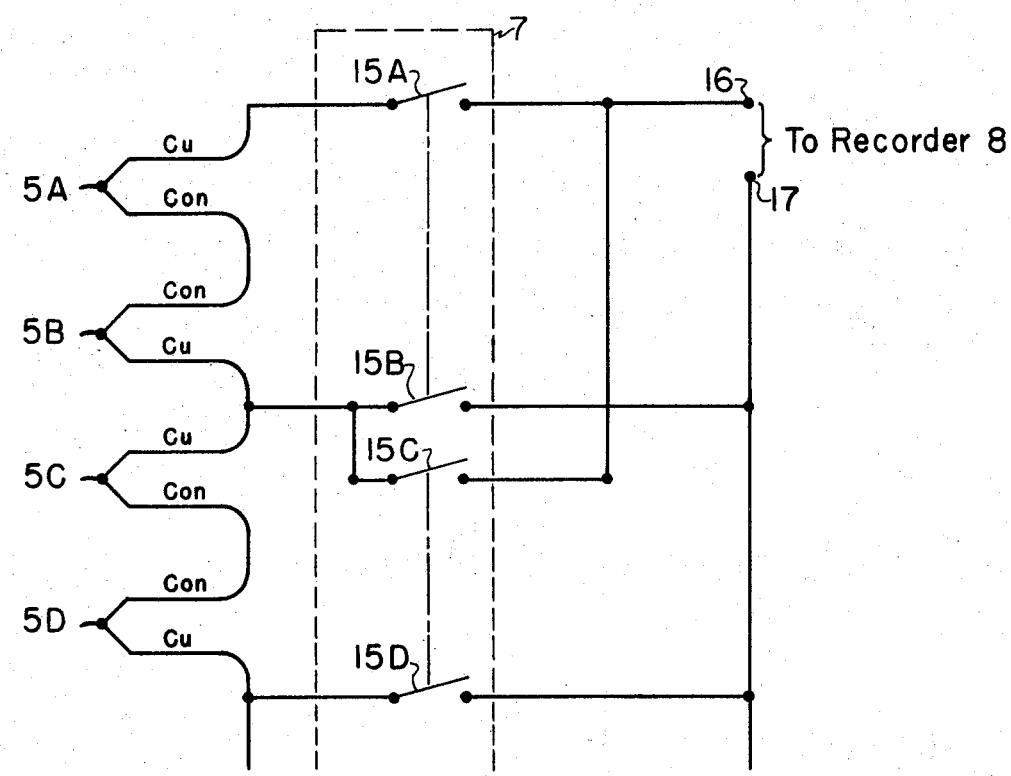
FIG. 4 is a diagram illustrating the operation of the sequential switch.

FIG. 4 illustrates a form of electrical arrangement to provide the desired compositing of primary signals. This figure is framentary in that it includes only a portion of the apparatus, the arrangement of the remainder will be obvious from that which is shown.

Sensors 5A, 5B, etc. which take the form of conventional thermo-couples are connected in series in constantan-to-constantan and copper-to-copper relationship. This is indicated in the figure by the abbreviations Con and Cu.

Within sequential switch 7 (represented by the broken lines) are a pair of ganged switches 15A, 15B, and a similar pair 15C, 15D. These are normally in open position, and at predetermined intevals one or the other pair is closed by conventional means not illustrated. For example, at a first point of time switches 15A and 15B are closed. Thereby sensors 5A and 5B are connected to terminals 16 and 17 which, in turn, are connected to recorder 8. Since sensors 5A and 5B are joined in such manner that the developed EMF's oppose one another, the primary signals A and B are subtracted one from the other, and the resulting secondary signal which is representative of the relative temperature between cans 4A and 4B is impressed across terminals 16 and 17. In a second point of time, switches 15C and 15D are closed whereby a corresponding action takes place, and a secondary signal representative of the relative temperature between cans 4C and 4D is impressed across terminals 16 and 17. In similar manner, secondary signals representative of relative temperatures between all adjacent cans in the system are periodically impressed across terminals 16 and 17 and so displayed by recorder 8.

As explained above, a critical feature of the invention is that it makes possible the selective detection of temperature changes attributable to microbial growth. Such a desirable result is primarily due to the feature that we measure relative temperatures (in contrast to absolute temperatures), whereby the effects of extraneous factors are neutralized. This item can be demonstrated as follows: If two cans are placed in a conventional storage room, their temperature will fluctuate considerably due to extraneous factors such as the diurnal temperature cycle. Accordingly, the temperatures of the individual cans cannot possibly give any clue to microbial growth which may be taking place within the cans. On the other hand, where one measures the relative temperature between the two cans, the extraneous temperature changes being the same as to each can are canceled out so that any residual amount reflects microbial activity within one or the other of the cans.

To obtain optimum neutralization of extraneous temperature changes, we prefer to apply our relative measurements to sets of can wherein the individual cans of each set are near one another. The significance of this is that if there are localized temperature variations within the storage area, the cans which are in proximity to one another will be affected equally. This, in turn, means that the extraneous factors will completely neutralize one another in the relative temperature determination.

Also for best results it is preferred that individual cans of each set be of the same size, and contain the same amount of the same product. In this way one can be assured that any factors (extraneous or due to microbial growth) will affect the temperature of individual cans to the same extent. For example, equal-sized cans of the same food product will have equal thermal properties, such as heat capacity. Therefore, if they are exposed to a temperature-affecting condition, they will both be affected to the same degree.

In the preceding illustration, it is explained that display of a positive or negative relative temperature is an indication of spoilage in one or the other of the set of cans. There should also be considered the point that both cans in a set might contain spoilage organisms. In such case, there might be a display of zero relative temperature—that is, a false indication of good quality. However, there are several factors which militate against such a possibility. A zero relative temperature would be displayed only in the unlikely event that both cans would spoil at the same time and to the same extent. If both cans should contain spoilage organisms, the odds are greater that there would be differences in time of spoilage and degree of spoilage with the result that a positive or negative relative temperature would be registered. Accordingly, the presence of spoilage would be detected. Moreover, the possibility of a false indication could be decreased by placing cans in the apparatus in such sequence that adjacent cans would not be from the same heat-processing bath. Although processors always aim at uniform heat processing, there are always minor variations in such factors as temperature and time of heating from batch to batch. Accordingly, if the cans are positioned in the manner described above, one will greatly decrease the likelihood that adjacent cans will both contain spoilage organisms and even more decrease the likelihood that both will contain the same organism in the same amount. Another technique for minimizing false indications involves the inclusion of a "reference" can within each set of cans. By "reference" can we mean a can of the same product but which had been treated in such a way as to preclude all possibility that it could spoil. This could be arranged by adding a bactericide to the contents and/or by deliberately over-processing it. This can would, of course, not be intended for use other than as a reference and would be marked accordingly to prevent its being co-mingled with the other cans on completion of the storage period. After one period of storage and detection is completed, the reference cans could be kept in place for use in connection with the next lot of cans to be assayed for spoilage. By using reference cans in this way, one is assured that if a positive or negative relative temperature is displayed by any particular set, the spoilage is not in the reference can but in the other can of the set.

It will be understood that the embodiment of the invention described in detail above may be modified in many ways, and that such modifications are included in the broad ambit of the invention. Several modifications are listed below by way of illustration and not limitation.

Generally, the cans undergoing detection for spoilage are held in an area of ordinary (room) temperature since if there are spoilage organisms present they will multiply at such temperatures, hence provide the desired indication of their presence. If, however, it is desirkd to accelerate the process, the cans may be held at somwhat elevated temperature to enhance microbial growth. Thus, for example, the storage may be in rooms maintained at temperatures as high as about 45° C. In situations where there is a possiblity of spoilage due to several organisms having different temperature-growth patterns, the can may be stored for a period of one temperature level which is optimum for growth of one of the suspected organisms and then stored for another period at a temperature which is optimum for growth of another of the suspected organisms. From the foregoing, it is evident that in any case the cans are to be stored at temperatures conducive to microbial growth and that this, in general, will be from about 20° to about 50° C.

The temperature measurements for spoilage detection may be conducted with any kind of instrumentality which is capable of sensing small temperature changes. Thus instead of thermistors, one could employ thermocouples or other contact devices which sense temperature by causing electrical changes. Optical devices could also be used, in which case contact would not be required. Such instruments have a lens and photo cell arrangement and measure the heat radiated by an object. For the purposes of the invention such an optical device would be arranged to scan a band of cans at fixed intervals and transfer the signals to a signal processing means as heretofore described. There are on the market paints which have the ability to change color as the temperature of the object on which they are coated varies. Such a paint could be applied to the cans and an optical device such as a photometer used to accurately measure the color of the paint coating and thereby provide signals as to the temperatures of the cans. Also suitable for the practice of the invention are infrared pyrometers, bolometers, or infrared-sensitive video camera equipment. For example, there are available on the market infrared scanning devices which can accurately detect temperatures by measuring the infrared radiation given off by objects. Devices of this type include a camera unit for detecting temperature, and another unit for processing the resulting signals and displaying them on an oscilloscope or similar viewing screen. For the purposes of the invention such an infrared scanning camera would be arranged to scan a bank of cans at fixed intervals and transfer the resulting primary signals to display unit where the primary signals are converted into secondary signals representative of relative temperatures, these secondary signals being then displayed on an oscilloscope or similar viewing screen.

In the modification detailed above each set contains two individual cans. It will be obvious that this is not a critical item. The sets may contain more than two cans, in which case the signal processing means would be adjusted to detect the relative temperature of the cans in each set of three, four, or more cans. Where such larger sets are used it would be preferable—if a positive or negative relative temperature is displayed—to discard all the cans of the set rather than trying to isolate the individual can which is contaminated.

In the detailed modification the detection results are displayed as points on a chart, these points eventually forming traces or curves. This system of displaying the information is not critical and one may employ various other systems. For example, a digital printer may be used to display the values of the secondary signals in numeral form for direct viewing or they may be recorded on tapes, discs, or the like. The recorded information may then be fed into a computer programmed to scan the information obtained during the entire storage period and provide a readout indicating which sets of cans exhibited microbial activity during the period of storage.

Further modifications of the invention will, of course, be obvious to those skilled in the art from the foregoing illustrations.

EXAMPLE

The invention is further demonstrated by the following illustrative example.

Two cans of corn which had been subjected to conventional heat processing were treated as follows:

One can was punctured and inoculated with *Bacillus macerans*. Nothing was done to the other can.

A thermocouple was taped to an end of each can, the leads from the thermocouples being connected with a recorder through a differential amplifier to determine the relative temperature of the cans from time to time while they were stored at ambient temperatures, and to display this information.

The results obtained are tabulated below:

| Time, hrs. | Relative temp., °C. |
|---|---|
| 0 | 0.000 |
| 15 | 0.000 |
| 20 | 0.042 |
| 25 | 0.060 |
| 30 | 0.084 |
| 35 | 0.096 |
| 40 | 0.096 |
| 45 | 0.080 |
| 50 | 0.060 |
| 55 | 0.018 |
| 60 | 0.006 |
| 70 | 0.000 |

Having thus described the invention, what is claimed is:

1. A method for non-destructive detection of spoilage in sealed containers enclosing a perishable commodity, which comprises:
    a. storing the containers at a temperature conducive to microbial growth, with individual containers in close proximity to one another,
    b. during said storage period taking primary measurements of the temperatures of individual containers as influenced by both extraneous and internal factors, and
    c. converting the primary temperature measurements of adjicent individual containers into secondary measurements providing an index to the quality of the containers and their enclosed contents.

2. A method for non-destructive detection of spoilage in sealed containers enclosing a perishable commodity, which comprises:
    a. storing the containers at a temperature conducive to microbial growth, with individual containers in close proximity to one another,
    b. during the storage providing primary signals representative of the temperatures of individual containers as influenced by both extraneous and internal factors,
    c. processing the primary signals from adjacent individual containers to eliminate components derived from extraneous temperature factors and to provide secondary signals representative solely of internal temperature factors, and,
    d. displaying said secondary signals to provide an index to the quality of the containers and their enclosed contents.

3. Apparatus for non-destructive detection of spoilage in sealed containers enclosing a perishable commodity, which comprises
    a. means for storing said sealed containers, with individual containers in close proximity to one another,
    b. temperature-sensing means for providing primary signals representative of the absolute temperatures of individual containers,
    c. signal-processing means coupled with said temperature-sensing means and programmed to receive the primary signals from adjacent individual containers and to convert them into secondary signals representative of the relative temperature of sets of the containers, and
    d. means for displaying said secondary signals to provide an index of the quality of the containers and their enclosed contents.

4. Apparatus for non-destructive detection of spoilage in sealed containers enclosing a perishable commodity, which comprises
    a. means for supporting the containers in an area maintained at a temperature conducive to microbial growth, with individual containers in close proximity to one another,
    b. temperature-sensing means for providing primary signals representative of the absolute temperatures of individual containers,
    c. signal-processing means coupled with the said temperature-sensing means and programmed to receive said primary signals from adjacent individual containers, and to convert them into secondary signals representative of the relative temperature of selected sets of containers, and
    d. means for displaying said secondary signals to provide an index of the quality of the containers and their enclosed contents.

5. Apparatus for non-destructive detection of spoilage in sealed containers enclosing a perishable commodity which comprises
    a. means for storing said sealed containers, with individual containers in close proximity to one another,
    b. a plurality of temperature-sensing elements, each element in operative relationship with a single container for producing a primary signal representative of the absolute temperature of individual containers it is associated with, c. signal processing means coupled with said temperature-sensing elements and programmed to receive said primary signals from adjacent individual containers and to convert them into secondary signals representative of the relative temperatures of selected sets of containers, and d. means for displaying said secondary signals to provide an index of the quality of the containers and their enclosed contents.

6. Apparatus for non-destructive detection of spoilage in sealed containers enclosing a perishable commodity, which comprises a. means for supporting the containers in an area maintained at a temperature conducive to microbial growth, with individual containers in close proximity to one another, b. a plurality of temperature-sensing elements, each in operative relationship with a single container for producing a primary signal representative of the absolute temperature of the container it is associated with, c. signal-processing means coupled with said temperature-sensing elements and programmed to sequentially receive primary signals derived from selected sets of the containers, to eliminate from these primary signals components derived from extraneous temperature variations, and to sequentially convert the primary signals into secondary signals representative of temperature variation within the containers, and d. means for displaying said secondary signals to provide an index to the quality of the containers and their enclosed contents.

* * * * *